(12) United States Patent
Liu et al.

(10) Patent No.: US 10,419,122 B2
(45) Date of Patent: Sep. 17, 2019

(54) MULTIPLEXER/DEMULTIPLEXER AND PASSIVE OPTICAL NETWORK SYSTEM

(71) Applicant: HUAWEI TECHNOLOGIES CO., LTD., Shenzhen (CN)

(72) Inventors: Dekun Liu, Wuhan (CN); Shengping Li, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/120,436

(22) Filed: Sep. 3, 2018

(65) Prior Publication Data
US 2019/0036609 A1 Jan. 31, 2019

Related U.S. Application Data

(63) Continuation of application No. PCT/CN2016/075473, filed on Mar. 3, 2016.

(51) Int. Cl.
*H04J 14/02* (2006.01)
*H04B 10/50* (2013.01)
(Continued)

(52) U.S. Cl.
CPC ....... *H04B 10/504* (2013.01); *H04B 10/2507* (2013.01); *H04B 10/2513* (2013.01);
(Continued)

(58) Field of Classification Search
CPC .................................................. H04J 14/02
See application file for complete search history.

(56) References Cited

U.S. PATENT DOCUMENTS

| 2002/0171914 A1* | 11/2002 | Meli | H04B 10/2503 |
| | | | 359/333 |
| 2005/0002672 A1* | 1/2005 | Sakai | H04B 10/25073 |
| | | | 398/85 |

(Continued)

FOREIGN PATENT DOCUMENTS

| CA | 2454631 A1 | 1/2003 |
| CN | 102621765 A | 8/2012 |

(Continued)

OTHER PUBLICATIONS

ITU-T G.989.2. Series G: Transmission Systems and Media, Digital Systems and Networks Digital sections and digital line system—Optical line systems for local and access networks, 40-Gigabit-capable passive optical networks 2 (NG-PON2): Physical media dependent (PMD) layer specification, Dec. 2014, 108 pages.

(Continued)

*Primary Examiner* — Shi K Li
(74) *Attorney, Agent, or Firm* — Kilpatrick Townsend & Stockton LLP (57) ABSTRACT

A multiplexer/demultiplexer and a passive optical network system are provided. The multiplexer/demultiplexer includes N optical multiplexing/demultiplexing modules. The optical multiplexing/demultiplexing modules multiplex signals with different wavelengths from a plurality of ports to a same port, or demultiplex signals with different wavelengths from one port to different ports. The N optical multiplexing/demultiplexing modules correspond to the signals with different wavelengths. In the optical multiplexing/demultiplexing modules, a negative dispersion amount and an insertion loss of an $M^{th}$ optical multiplexing/demultiplexing module are less than those of an $(M+1)^{th}$ optical multiplexing/demultiplexing module, where N is a positive integer, and M is a positive integer less than or equal to N. The multiplexer/demultiplexer and the passive optical network system increase an optical power budget between an optical transmitter and an optical transceiver.

7 Claims, 7 Drawing Sheets

(51) Int. Cl.
  *H04B 10/2513*  (2013.01)
  *H04B 10/2507*  (2013.01)
  *H04B 10/27*  (2013.01)
  *H04J 14/08*  (2006.01)

(52) U.S. Cl.
  CPC .............. *H04B 10/27* (2013.01); *H04J 14/02* (2013.01); *H04J 14/0202* (2013.01); *H04J 14/08* (2013.01)

(56) References Cited

U.S. PATENT DOCUMENTS

| | | |
|---|---|---|
| 2005/0088768 A1 | 4/2005 | Bhatia |
| 2016/0006510 A1 | 1/2016 | Chen et al. |
| 2016/0315698 A1 | 10/2016 | Zhou et al. |

FOREIGN PATENT DOCUMENTS

| | | |
|---|---|---|
| CN | 102870294 A | 1/2013 |
| CN | 103475955 A | 12/2013 |
| CN | 104009802 A | 8/2014 |
| GB | 2330026 A | 4/1999 |
| WO | 03009032 A1 | 1/2003 |
| WO | 2015100658 A1 | 7/2015 |

OTHER PUBLICATIONS

"Li Yan, Theoretical and Experimental Research of Dynamical Chromatic Dispersion Compensation in High-bit-rate Optical Fiber Communication Systems. Chinese doctoral thesis full-text database, Apr. 2009, 5 pages".

\* cited by examiner

MULTIPLEXER/DEMULTIPLEXER AND PASSIVE OPTICAL NETWORK SYSTEM

CROSS-REFERENCE TO RELATED APPLICATIONS

This application is a continuation of International Application No. PCT/CN2016/075473, filed on Mar. 3, 2016, the disclosure of which is hereby incorporated by reference in its entirety.

TECHNICAL FIELD

The present invention relates to the field of optical communications technologies, and in particular, to a multiplexer/demultiplexer and a passive optical network system.

BACKGROUND

Figure 1:
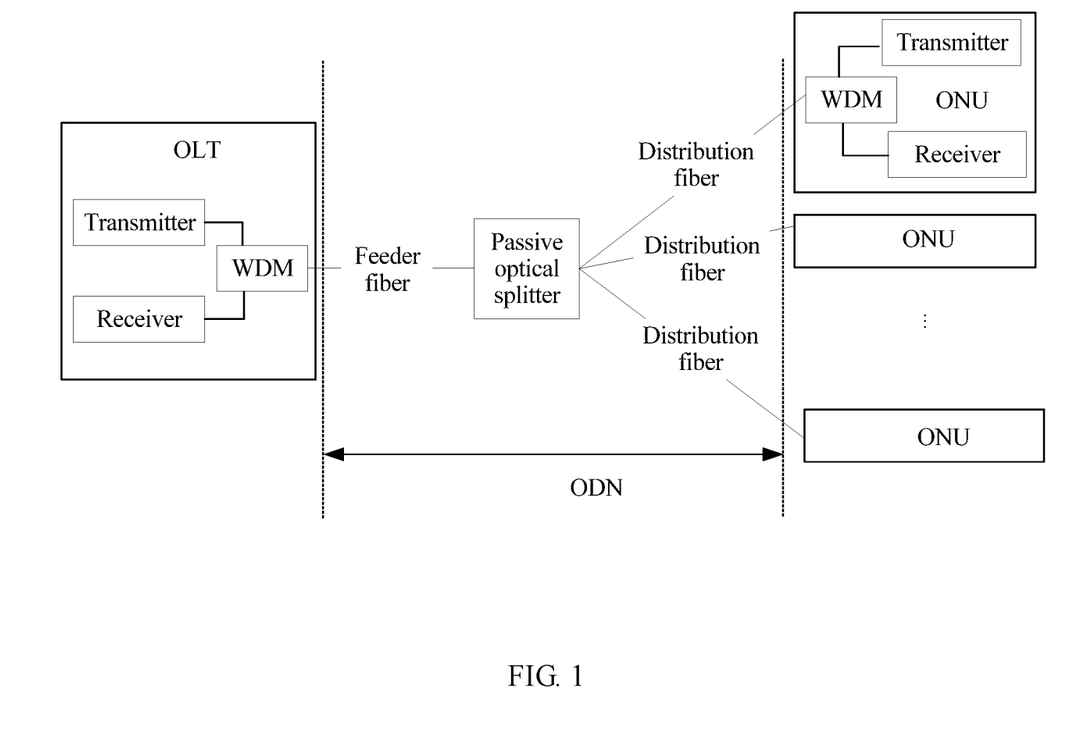
FIG. 1 is a schematic structural diagram of a passive optical network system in the prior art.

As shown in FIG. 1, an existing passive optical network (PON) system generally includes the following three parts: an optical line terminal (OLT), an optical distribution network (ODN), and an optical network unit (Optical Network Unit, ONU) or an optical network terminal (ONT). In the PON system, transmission in a direction from the OLT to the ONU/ONT is downlink, and transmission in an opposite direction is uplink. Because of properties of light, downlink data is broadcast by the OLT to each ONU. The OLT allocates a transmit timeslot to each ONU to send uplink data. Time division multiplex transmission is used in the uplink direction. The ODN is a passive light splitter, transmits downlink data of the OLT to each ONU, and collects and transmits, to the OLT, uplink data of a plurality of ONUs. The ONU provides a user-side interface for the PON system, and is connected to the ODN in uplink. The ODN usually includes three parts: a passive optical splitter (Splitter), a feeder fiber, and a distribution fiber. Different wavelengths are respectively used in downlink and uplink for a common PON system.

Figure 2:
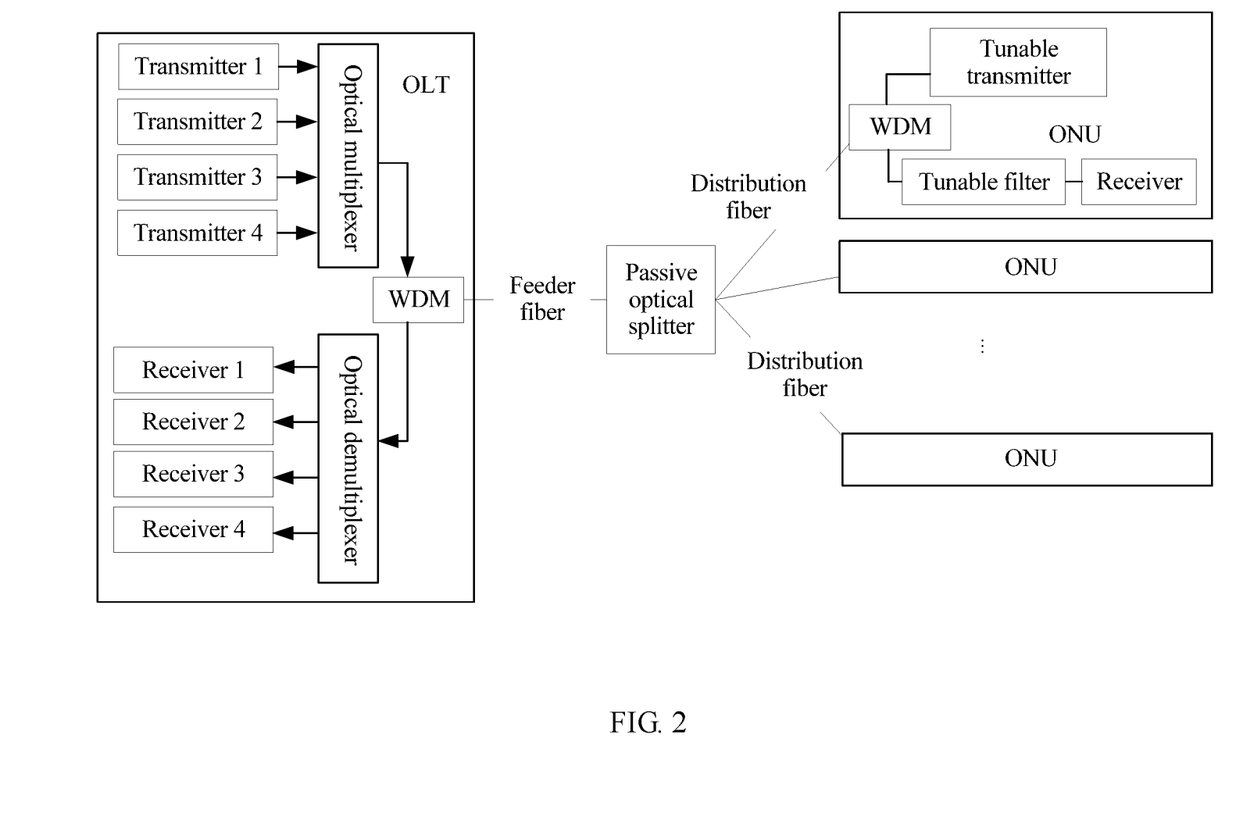
FIG. 2 is a schematic structural diagram of a TWDM PON in the prior art.

As shown in FIG. 2, a time wavelength division multiplexing passive optical network (TWDM PON) is obtained through extension based on an architecture of a PON. TWDM is an acronym of time division multiplexing (TDM) and wavelength division multiplexing (WDM). The TWDM PON has a same network structure of an entire ODN as the PON, and a main difference lies in that a quantity of uplink and downlink wavelengths increases from one to four or more. In the downlink direction, four transmitters on a side of an OLT respectively emit four different wavelengths, and the four different wavelengths pass through an optical multiplexer, enter a feeder fiber, and then arrive at an ONU. A receiver of the ONU selects only one wavelength for receiving. Therefore, one filter needs to be disposed before the receiver. Four different filters may be prepared for different ONUs because one of the four wavelengths is to be selected. Alternatively, a tunable filter may be used, and configured for different wavelengths according to an actual need, thereby reducing types of filters. In the uplink direction, any ONU emits one of four uplink wavelengths. Therefore, there are four uplink beams at any moment. Similar to the case of filters, the transmitters may be optionally four different lasers, or may be one laser and adjusted to a particular wavelength as required, thereby reducing types of ONUs. After entering the optical distribution network, the four uplink wavelengths arrive at an optical demultiplexer of the OLT. The optical demultiplexer separates the four uplink beams with different wavelengths, which then enter different receivers. WDM on the OLT and the ONU is a filter for aggregating or separating uplink and downlink wavelengths.

Compared with an existing 10G PON system, for a TWDM-PON system, a wavelength multiplexer and demultiplexer need to be additionally introduced on the side of the OLT, to multiplex or demultiplex a plurality of uplink and downlink wavelengths, and a tunable filter needs to be introduced on a side of the ONU, to select a wavelength. A tunable transmitter needs to be introduced for the transmitter. These devices and the like cause an additional insertion loss. In order to be compatible with an existing and deployed optical distribution network ODN network, a higher optical power budget is required between an optical transmitter and an optical transceiver of the TWDM-PON system. To achieve this effect, the following technical solutions are provided in the prior art.

To increase the optical power budget of the system, most commonly seen methods are: (1) increasing an optical power of a transmitter, where a high-power transmitter is used; (2) improving sensitivity of a receiver, where a high-sensitivity receiver is used; (3) adding an optical amplifier.

The method (3) has high costs, and sensitivity of a currently most commonly used receiver, such as an avalanche photodiode (APD), is limited by a current technical level, has been close to a limit, and is difficult to improve in the short term. For a common direct modulated laser, an output optical power of a laser is changed by directly changing a pump current of the laser. Because no external modulator needs to be used, no additional insertion loss is introduced. Therefore, a higher optical power can be transmitted. However, although the direct modulated laser can transmit a higher optical power, a modulation chirp of the direct modulated laser is very large, and signal quality of a transmit signal sharply deteriorates because of dispersion after the transmit signal is transmitted through a fiber, causing a very high optical power penalty (to be specific, causing a significant decrease in receiving sensitivity). This cannot increase the optical power budget.

Figure 3:
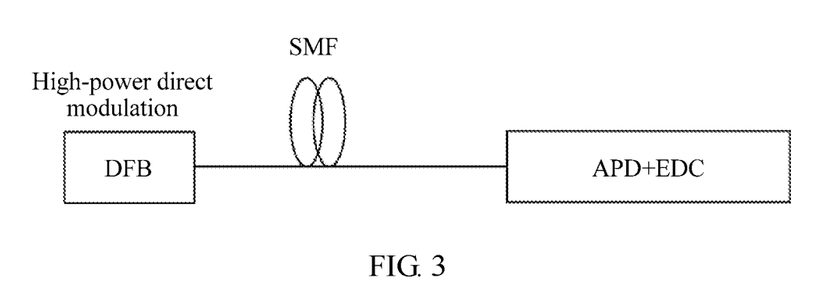
FIG. 3 is a schematic structural diagram of an apparatus in a dispersion compensation solution in the prior art.

Based on the foregoing problem, the prior art further provides a high optical power budget solution (where a structure is shown in FIG. 3) of a high-power-based direct modulated laser and electronic dispersion compensation (EDC). The high-power-based direct modulated laser transmits a relatively strong optical power signal, and receiving sensitivity deterioration caused by dispersion is removed by using an electronic dispersion compensation method at a receive end, thereby increasing an overall optical power budget of a link.

The high optical power budget solution of the high-power-based direct modulated laser and the electronic dispersion compensation has the following disadvantages: An electronic dispersion compensation EDC chip is usually very expensive, and there has been no mature solution in the industry, especially for electronic dispersion compensation for a burst signal in uplink. In addition, the electronic dispersion compensation introduces some noise, and is usually more applicable to transmission dispersion compensation of hundreds or thousands of kilometers in the transport network field. For the PON field, there is usually a fiber distance of only 20 kilometers, a residual dispersion amount is still relatively large after the compensation, and therefore, relatively limited sensitivity is improved.

SUMMARY

The present invention provides a multiplexer/demultiplexer and a passive optical network system. The apparatuses provided in the present invention resolve a problem of sharp deterioration in signal quality caused by dispersion in all prior-art methods for increasing an optical power budget between an optical transmitter and an optical transceiver.

According to a first aspect, the present invention provides a multiplexer/demultiplexer, where the multiplexer/demultiplexer includes N optical multiplexing/demultiplexing modules, the optical multiplexing/demultiplexing modules multiplex signals with different wavelengths from a plurality of ports to a same port, or demultiplex signals with different wavelengths from one port to different ports, where the N optical multiplexing/demultiplexing modules correspond to the signals with different wavelengths; and in the optical multiplexing/demultiplexing modules, a negative dispersion amount and an insertion loss of an $M^{th}$ optical multiplexing/demultiplexing module are less than those of an $(M+1)^{th}$ optical multiplexing/demultiplexing module, where N is a positive integer, and M is a positive integer less than or equal to N.

With reference to the first aspect, in a first possible implementation, any one of the optical multiplexing/demultiplexing modules includes a narrow-band filter and a reflector, where the reflector is further configured to perform negative dispersion compensation.

With reference to the first possible implementation of the first aspect, in a second possible implementation, the reflector is an etalon filter or a Gires-Tournois interference filter.

With reference to the first or the second possible implementation of the first aspect, in a third possible implementation, a reflection band of the narrow-band filter includes a function of increasing a negative dispersion amount.

With reference to any one of the first aspect or the first to the third possible implementations of the first aspect, in a fourth possible implementation, the narrow-band filter includes a plurality of cascaded Gires-Tournois interference filters with a same wavelength.

According to a second aspect, the present invention provides a multi-wavelength system, where the system includes a plurality of receivers and the multiplexer/demultiplexer according to any one of the first aspect and the first to the fourth possible implementations of the first aspect.

The demultiplexer demultiplexes, to different ports, signals with different wavelengths that are received from a common port.

The plurality of receivers are respectively connected to the different ports of the demultiplexer, and receive the signals with different wavelengths that are output from the different ports of the demultiplexer.

According to a third aspect, the present invention provides a multi-wavelength system, where the system includes a plurality of direct modulated transmitters with different wavelengths and the multiplexer/demultiplexer according to any one of the first aspect and the first to the fourth possible implementations of the first aspect.

The plurality of direct modulated transmitters with different wavelengths respectively generate signals with different wavelengths, and the plurality of direct modulated transmitters with different wavelengths are connected to the different ports for multiplexing.

The multiplexer multiplexes, to a same port, the signals with different wavelengths that are input from the different ports.

According to a fourth aspect, the present invention provides a passive optical network system, where the system includes a direct modulated laser, an optical line terminal, a plurality of optical network units with different distances, and a negative dispersion element, where an optical signal transmitted by the direct modulated laser passes through the negative dispersion element and is then transmitted to the plurality of optical network units with different distances through an optical fiber, where a negative dispersion amount of the negative dispersion element is a specified value.

With reference to the fourth aspect, in a first possible implementation, the negative dispersion amount of the negative dispersion element is greater than a maximum dispersion amount of the passive optical network system, and the maximum dispersion amount is a positive dispersion amount when the optical line terminal in the passive optical network system transmits a signal to a most distant optical network unit.

With reference to the fourth aspect or the first possible implementation of the fourth aspect, in a second possible implementation, the optical line terminal is a high-speed direct modulated transmitter.

With reference to the fourth aspect or the first possible implementation of the fourth aspect, in a third possible implementation, the optical network unit is a high-speed direct modulated transmitter.

One or two of the foregoing technical solutions have at least the following technical effects:

The multiplexer/demultiplexer and the passive optical network system provided in the embodiments of the present invention provide corresponding negative dispersion compensation for signals with different insertion losses. This can effectively increase an overall optical power budget (to be specific, a maximum allowed link attenuation) of a system.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following further describes the embodiments of the present invention in detail with reference to the accompanying drawings of this specification.

In the prior art, because a direct modulated laser has some natural positive dispersion, an appropriate amount of negative dispersion can further improve sensitivity performance of an optical signal. Based on the principle, the present invention provides the following methods and apparatuses to implement dispersion management during transmission of the optical signal, specifically including:

Embodiment 1

Figure 4:
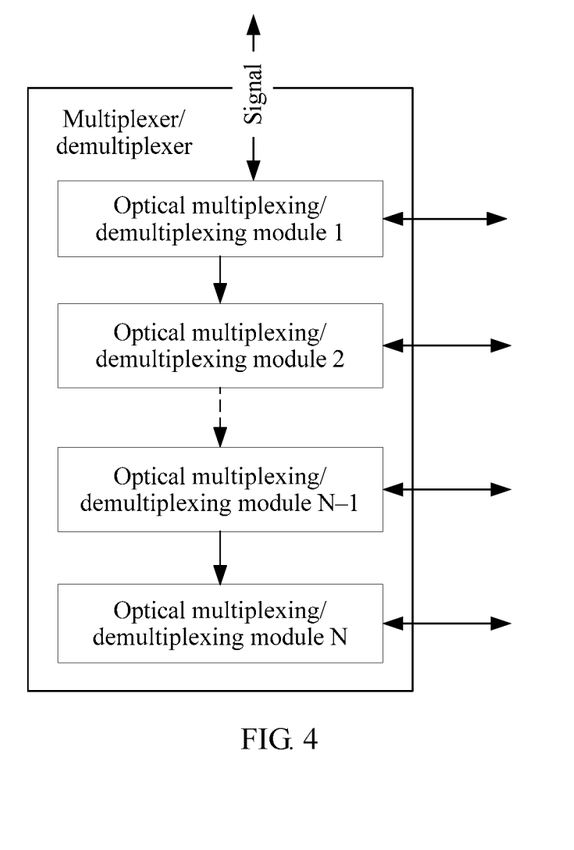
FIG. 4 is a schematic structural diagram of a multiplexer/demultiplexer according to an embodiment of the present invention.

As shown in FIG. 4, this embodiment of the present invention provides a multiplexer/demultiplexer. The multiplexer/demultiplexer includes N optical multiplexing/demultiplexing modules. The optical multiplexing/demultiplexing modules multiplex signals with different wavelengths from a plurality of ports to a same port, or demultiplex signals with different wavelengths from one port to different ports.

The N optical multiplexing/demultiplexing modules correspond to the signals with different wavelengths. In the optical multiplexing/demultiplexing modules, a negative dispersion amount and an insertion loss of an $M^{th}$ optical multiplexing/demultiplexing module are less than those of an $(M+1)^{th}$ optical multiplexing/demultiplexing module, where N is a positive integer, and M is a positive integer less than or equal to N.

Figure 5:
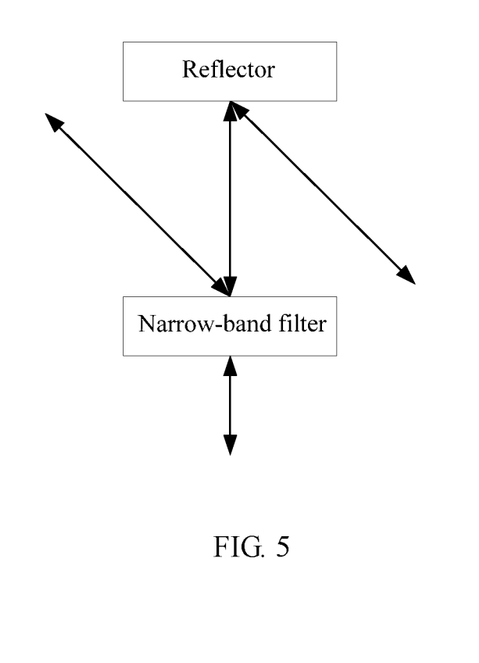
FIG. 5 is a schematic structural diagram of an optical multiplexing/demultiplexing module according to an embodiment of the present invention.

Optionally, any optical multiplexing/demultiplexing module in this embodiment includes a narrow-band filter and a reflector (as shown in FIG. 5). The reflector is further configured to perform negative dispersion compensation.

The reflector may be an element that is provided in the prior art, that can implement reflection, and that has a negative dispersion function. The reflector may be an etalon filter or a Gires-Tournois interference filter.

Figure 6:
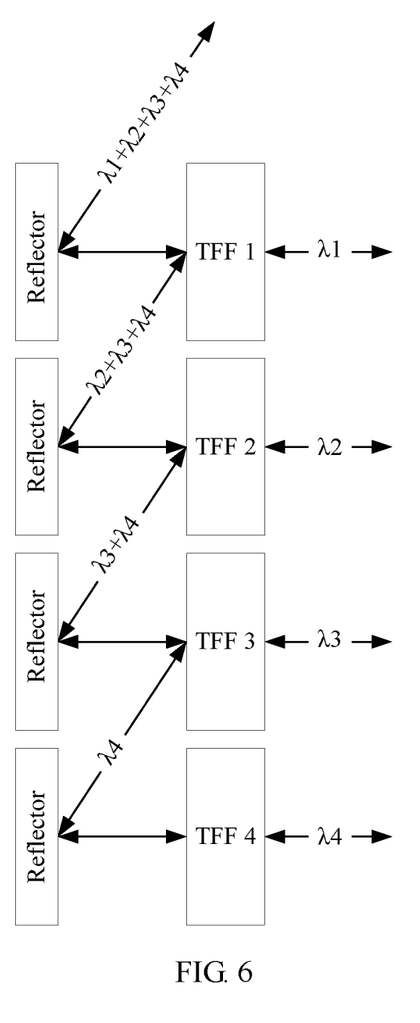
FIG. 6 is a schematic diagram of a specific structure of a multiplexer/demultiplexer according to an embodiment of the present invention.

If the multiplexer/demultiplexer includes four optical multiplexing/demultiplexing modules, a specific structure is shown in FIG. 6. The method provided in this embodiment of the present invention is further described in detail by using an example in which a signal with four wavelengths is demultiplexed by using the structure shown in FIG. 6.

After being input into the multiplexer/demultiplexer through a common port of the multiplexer/demultiplexer, a compound signal with four wavelengths (including wavelengths λ1 to λ4) passes through a reflector 1 in a first optical multiplexing/demultiplexing module, and then passes through a filter 1 (which may be a narrow-band thin film filter (TFF) 1). The wavelength λ1 may be emergent from a port 1 of the multiplexer/demultiplexer through the TFF 1. The wavelength λ2 to the wavelength λ4 remaining in the compound signal are all reflected back by the TFF 1.

The wavelength 2 to the wavelength 4 that are reflected by the TFF 1 further pass through a reflector 2 (where the reflector is a negative dispersion optical element) in a second optical multiplexing/demultiplexing module, and then enter a TFF 2 in the second optical multiplexing/demultiplexing module. The wavelength λ2 that matches the TFF 2 may be emergent from a port 2 of the multiplexer/demultiplexer through the TFF 2. The remaining wavelength λ3 and wavelength λ4 are reflected by the TFF 2. The rest can be deduced by analogy. Each time the compound signal passes through one thin film filter, one wavelength may be obtained through demultiplexing. In addition, wavelengths remaining in the compound signal further pass through a negative dispersion element, until all the wavelengths are obtained through demultiplexing.

As can be learned from the foregoing embodiment, a signal of the wavelength λ1 passes through only one negative dispersion optical element and one thin film filter. Therefore, the signal of the wavelength λ1 has a smallest insertion loss and a smallest negative dispersion amount. A signal of the wavelength λ4 passes through four negative dispersion optical elements, and is reflected by three TFFs and transmitted by one TFF. Therefore, the signal of the wavelength λ4 has a largest insertion loss and a largest negative dispersion amount.

In this embodiment of the present invention, signals that are output through different ports have different insertion losses and negative dispersion amounts. A negative dispersion amount for a port with a relatively small insertion loss is relatively small, and a negative dispersion amount for a port with a relatively large insertion loss is relatively large. Compensation of the relatively large negative dispersion amount on the port with the relatively large insertion loss can effectively compensate system dispersion and improve system receiving sensitivity. The port with the relatively small insertion loss corresponds to the relatively small negative dispersion amount, so that a relatively high optical power enters a receiver, thereby increasing an overall optical power budget of a system.

Further, the narrow-band filter in each optical multiplexing/demultiplexing module in this embodiment of the present invention needs to transmit a wavelength matching the narrow-band filter and reflect a wavelength that does not match the narrow-band filter. To increase a negative dispersion amount of the reflected signal, a reflection band of the narrow-band filter in the optical multiplexing/demultiplexing module includes a function of increasing the negative dispersion amount.

Figure 7:
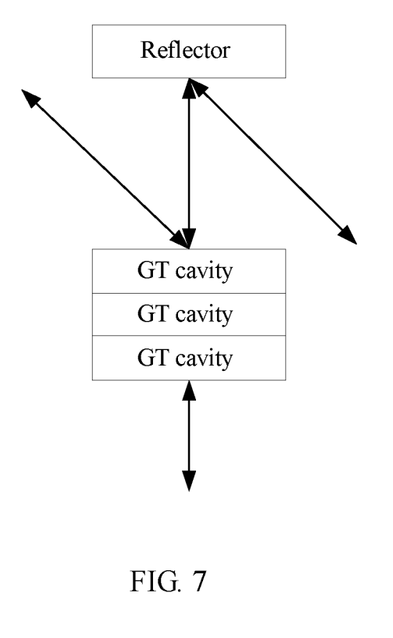
FIG. 7 is a schematic structural diagram of a specific implementation of a filter in an optical multiplexing/demultiplexing module according to an embodiment of the present invention.

Optionally, to enable the narrow-band filter to better increase the negative dispersion amount, the filter in this embodiment may include a plurality of cascaded Gires-Tournois interference filters with a same wavelength (as shown in FIG. 7).

Certainly, as can be learned from a fact that an optical path is reversible, if signals with different wavelengths are respectively incident through the ports of the multiplexer/demultiplexer, all the wavelengths are emergent from the common port. Therefore, an implementation of the demultiplexing is also applicable to multiplexing of signals with different wavelengths by the multiplexer/demultiplexer. Details are not described again below.

Embodiment 2

Figure 8:
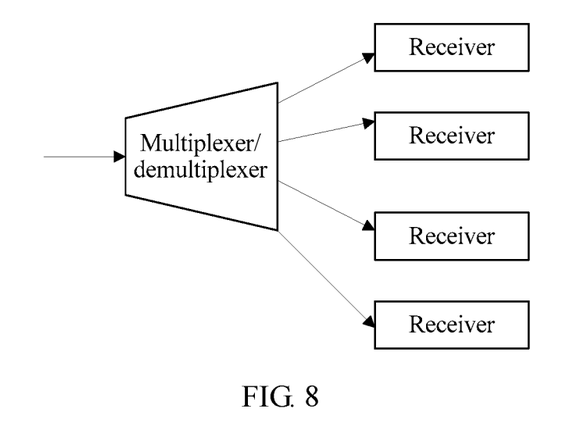
FIG. 8 is a schematic structural diagram of a multi-wavelength system according to an embodiment of the present invention.

As shown in FIG. 8, based on the multiplexer/demultiplexer provided in Embodiment 1, this embodiment of the present invention further provides a multi-wavelength system. The system includes a plurality of receivers and the multiplexer/demultiplexer according to any implementation provided in Embodiment 1.

The multiplexer/demultiplexer demultiplexes, to different ports, signals with different wavelengths that are received from a common port.

The plurality of receivers are respectively connected to the different ports of the multiplexer/demultiplexer, and receive the signals with different wavelengths that are output from the different ports of the multiplexer/demultiplexer.

In this embodiment, the multiplexer/demultiplexer mainly demultiplexes a compound signal with a plurality of wavelengths. A solution may be specifically implemented as follows:

The multiplexer/demultiplexer demultiplexes the input compound signal with the plurality of wavelengths, and then the signal sequentially enters corresponding receivers. The multiplexer/demultiplexer has a plurality of ports. In this embodiment, for example, the multiplexer/demultiplexer has four ports. A port 1 may demultiplex and output a wavelength 1 from the common port. An insertion loss for the port 1 is the smallest (for example 1.0 dB), and a negative dispersion amount for the port 1 is also the smallest, for example, −85 ps/nm. A port 2 may demultiplex and output a wavelength 2. An insertion loss for the port 2 is greater than that for the port 1, and a negative dispersion amount for the port 2 is also greater than that for the port 1. The rest can be deduced by analogy. Insertion losses for the ports of the multiplexer/demultiplexer gradually increase from the port 1 to a port 4, and negative dispersion amounts corresponding to the ports also gradually increase in direct proportion to the insertion losses.

Therefore, when a signal of the wavelength 1 passes through the multiplexer/demultiplexer, because the insertion loss for the port 1 is the smallest, an optical power received by a receiver 1 corresponding to the port 1 is the largest, and the signal may be properly detected by the receiver. When a signal of the wavelength 2 passes through the multiplexer/demultiplexer, because the insertion loss for the port 2 is greater than that for the port 1, a signal power received by a receiver 2 corresponding to the port 2 is less than that for the wavelength 1. However, the negative dispersion amount for the port 2 is greater than that for the port 1, and the negative dispersion amount can better compensate a dispersion penalty of the signal of the wavelength 2. Therefore, the signal of the wavelength 2 has higher receiving sensitivity, and based on the principle, the receiver can receive a signal with a smaller optical power. Therefore, the receiver 2 can also properly receive the signal carried by the wavelength 2. The rest can be deduced by analogy. Signals on all wavelength paths can be properly detected by the receivers.

Embodiment 3

Figure 9:
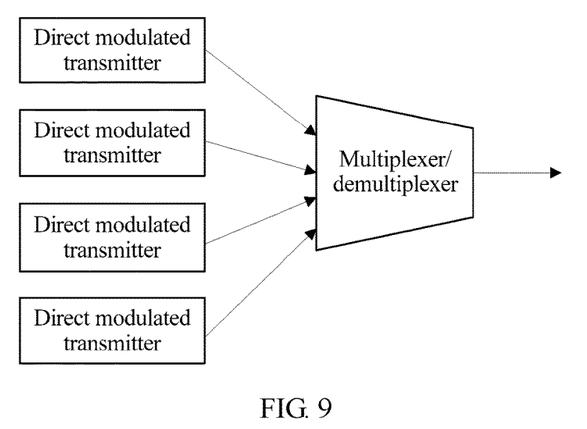
FIG. 9 is a schematic structural diagram of another multi-wavelength system according to an embodiment of the present invention.

As shown in FIG. 9, based on the multiplexer/demultiplexer provided in Embodiment 1, this embodiment of the present invention further provides another multi-wavelength system. The system includes a plurality of direct modulated transmitters with different wavelengths and the multiplexer/demultiplexer according to any implementation provided in Embodiment 1.

The plurality of direct modulated transmitters with different wavelengths respectively generate signals with different wavelengths, and the plurality of direct modulated transmitters with different wavelengths are connected to the different ports of the multiplexer/demultiplexer.

The multiplexer/demultiplexer multiplexes, to a same port, the signals with different wavelengths that are input from the different ports.

In a specific optical network system, optical multiplexing and demultiplexing are a pair of reversible processes. The process of multiplexing the signals by the multiplexer/demultiplexer in this embodiment is a reverse process of signal demultiplexing in Embodiment 2. Therefore, based on the description of signal demultiplexing in Embodiment 2, a specific implementation of signal multiplexing by the system provided in this embodiment may be determined. Details are not described herein again.

Moreover, when the signal multiplexing and demultiplexing are used in cooperation with each other, a manner of processing the signals is only a combination of Embodiment 2 and Embodiment 3. Therefore, details are not described herein again.

Embodiment 4

Figure 10:
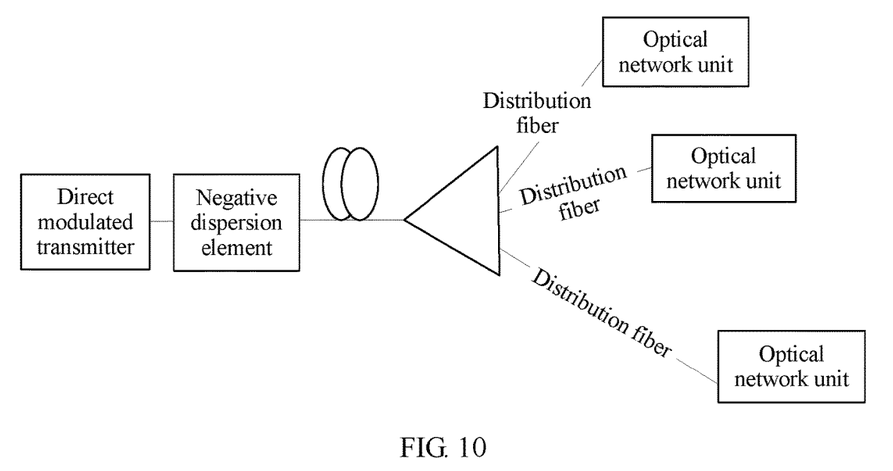
FIG. 10 is a schematic structural diagram of a passive optical network system according to an embodiment of the present invention.

In the prior art, for a PON system, although distances from different users to a central office are different, a feeder fiber in a PON network usually has a maximum length of only 20 km in total. According to this case, this embodiment of the present invention provides a passive optical network system (as shown in FIG. 10). The system includes a direct modulated laser, an optical line terminal, a plurality of optical network units with different distances, and a negative dispersion element with a fixed dispersion amount.

An optical signal transmitted by the direct modulated laser passes through the negative dispersion element and is then transmitted to the plurality of optical network units with different distances through an optical fiber. A negative dispersion amount of the negative dispersion element is a specified value.

For a PON system based on a transmitter of a direct modulated laser (DML), a negative dispersion optical element may be introduced for all users on a feeder fiber. The introduction of the negative dispersion optical element may be specifically implemented by adding a negative dispersion element to the passive optical network system, and a negative dispersion amount of the negative dispersion element is a specified value. In this way, a signal transmitted by each user arrives at a peer receiver with particular negative dispersion. Because the direct modulated laser has natural positive chirp characteristics, remaining residual negative dispersion may improve receiving sensitivity of the signal.

In an optimal implementation, the negative dispersion amount of the negative dispersion element is greater than a maximum dispersion amount of the passive optical network system, and the maximum dispersion amount is a positive dispersion amount when the optical line terminal in the passive optical network system transmits a signal to a most distant optical network unit.

Optionally, in the passive optical network system, the optical line terminal and/or the optical network unit may be a high-speed direct modulated transmitter.

In this embodiment of the present invention, the multiplexer/demultiplexer implements signal multiplexing and demultiplexing. A signal that is reflected for a larger quantity of times in the multiplexer/demultiplexer corresponds to a larger insertion loss. Therefore, in the multiplexer/demultiplexer provided in this embodiment of the present invention, a larger negative dispersion amount is compensated for a signal that is reflected for a large quantity of times, so that receiving sensitivity of the system is improved.

The multiplexer/demultiplexer and the passive optical network system provided in the embodiments of the present invention provide corresponding negative dispersion compensation for signals with different insertion losses. This can effectively increase an overall optical power budget (to be specific, a maximum allowed link attenuation) of a system.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A multiplexer/demultiplexer, wherein the multiplexer/demultiplexer comprises N optical multiplexing/demultiplexing modules, the optical multiplexing/demultiplexing modules multiplex signals with different wavelengths from a plurality of ports to a same port, or demultiplex signals with different wavelengths from one port to different ports, wherein
the N optical multiplexing/demultiplexing modules correspond to the signals with different wavelengths; and
in the optical multiplexing/demultiplexing modules, a negative dispersion amount and an insertion loss of an Mth optical multiplexing/demultiplexing module are less than those of an (M+1)th optical multiplexing/demultiplexing module, wherein N is a positive integer, and M is a positive integer less than or equal to N.

2. The multiplexer/demultiplexer according to claim 1, wherein any one of the optical multiplexing/demultiplexing modules comprises a narrow-band filter and a reflector, wherein the reflector is configured to perform negative dispersion compensation.

3. The multiplexer/demultiplexer according to claim 2, wherein the reflector is an etalon filter or a Gires-Tournois interference filter.

4. The multiplexer/demultiplexer according to claim 2, wherein a reflection band of the narrow-band filter comprises a function of increasing a negative dispersion amount.

5. The multiplexer/demultiplexer according to claim 2, wherein the narrow-band filter comprises a plurality of cascaded Gires-Tournois interference filters with a same wavelength.

6. A multi-wavelength system, wherein the system comprises a plurality of receivers and the multiplexer/demultiplexer;
the demultiplexer demultiplexes, to different ports, signals with different wavelengths that are received from a common port; and
the plurality of receivers are respectively connected to the different ports of the demultiplexer, and receive the signals with different wavelengths that are output from the different ports of the demultiplexer;
wherein the multiplexer/demultiplexer comprises N optical multiplexing/demultiplexing modules, the optical multiplexing/demultiplexing modules multiplex signals with different wavelengths from a plurality of ports to a same port, or demultiplex signals with different wavelengths from one port to different ports, wherein
the N optical multiplexing/demultiplexing modules correspond to the signals with different wavelengths; and
in the optical multiplexing/demultiplexing modules, a negative dispersion amount and an insertion loss of an Mth optical multiplexing/demultiplexing module are less than those of an (M+1)th optical multiplexing/demultiplexing module, wherein N is a positive integer, and M is a positive integer less than or equal to N.

7. A multi-wavelength system, wherein the system comprises a plurality of direct modulated transmitters with different wavelengths and the multiplexer/demultiplexer;
the plurality of direct modulated transmitters with different wavelengths respectively generate signals with different wavelengths, and the plurality of direct modulated transmitters with different wavelengths are connected to the different ports of the multiplexer; and
the multiplexer multiplexes, to a same port, the signals with different wavelengths that are input from the different ports;
wherein the multiplexer/demultiplexer comprises N optical multiplexing/demultiplexing modules, the optical multiplexing/demultiplexing modules multiplex signals with different wavelengths from a plurality of ports to a same port, or demultiplex signals with different wavelengths from one port to different ports, wherein
the N optical multiplexing/demultiplexing modules correspond to the signals with different wavelengths; and
in the optical multiplexing/demultiplexing modules, a negative dispersion amount and an insertion loss of an Mth optical multiplexing/demultiplexing module are less than those of an (M+1)th optical multiplexing/demultiplexing module, wherein N is a positive integer, and M is a positive integer less than or equal to N.

* * * * *